June 21, 1955  M. L. SMALLEGAN  2,711,240
EXPANSIBLE TROUGHS
Filed Aug. 30, 1950

Inventor
Marvin L. Smallegan
By Rice and Rice
Attorneys

United States Patent Office 2,711,240
Patented June 21, 1955

2,711,240

EXPANSIBLE TROUGHS

Marvin L. Smallegan, Zeeland, Mich., assignor to Automatic Poultry Feeder Company, Zeeland, Mich., a corporation of Michigan Application August 30, 1950, Serial No. 182,380

1 Claim. (Cl. 193—6)

The present invention relates to expansible troughs and more particularly to a rectangular poultry feeder trough on whose floor an endless sprocket chain may be caused to be moved to circulate feed deposited in the trough from a hopper.

This invention is a modification of the poultry feeder illustrated and described in the application for Letters Patent of the United States filed by Richard A. DeWitt on June 15, 1949, Serial No. 99,169, now Patent No. 2,658,605, an application filed by myself on March 2, 1950, Serial No. 147,281, now abandoned, and a second application filed by myself on July 27, 1950, Serial No. 176,138, now Patent No. 2,626,724.

The primary objects of the instant invention are to provide a trough of the general character above indicated which may be readily and conveniently expanded to tighten the sprocket chain from time to time and in instances wherein the chain requires tightening because of wear; to provide such an expansible trough which is simple in construction; and, to provide such a trough which is reasonably economical in manufacture.

An illustrative embodiment of the invention is shown in the accompanying drawing, wherein.

Figure 1:
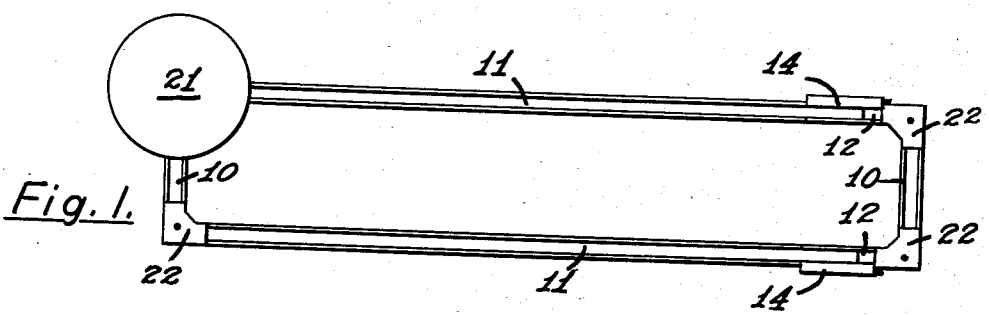
Figure 1 is a top plan view of the assembled rectangular expansible trough.
Figure 2:
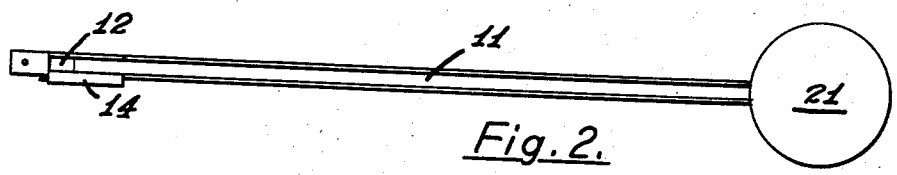
Figure 2 is a top plan view of a single length thereof.

Referring then to the drawing wherein like parts of the expansible trough shown are designated by the same numerals in the several views, the same comprises a rectangular U-shaped trough having end sections 10 and sectional side sections 11, 12 and 13, the section 11 being seated upon the middle section 13 and longitudinally slidable thereon in the manner presently to be described. The section 12 is seated upon and secured to the middle section 13 as by spot welding.

Figure 3:
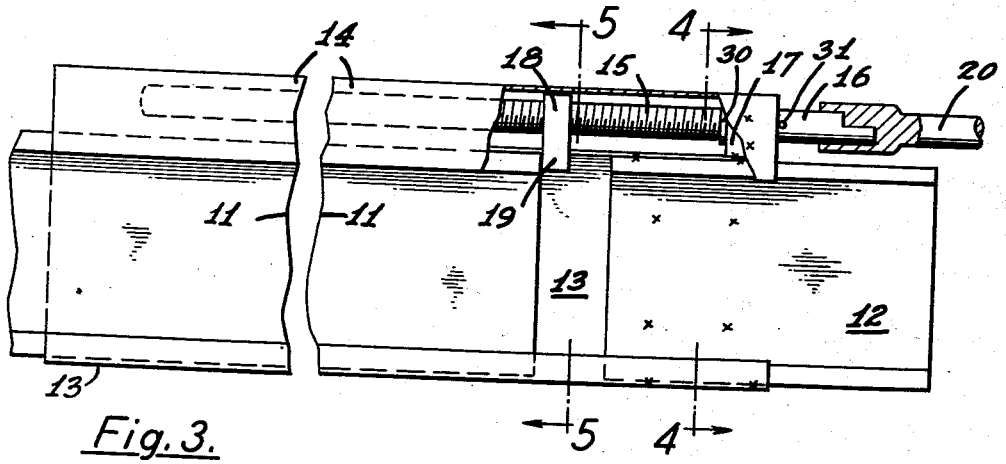
Figure 3 is an enlarged fragmentary top plan view of a length of the trough, partly broken away.
Figures 4, 5:
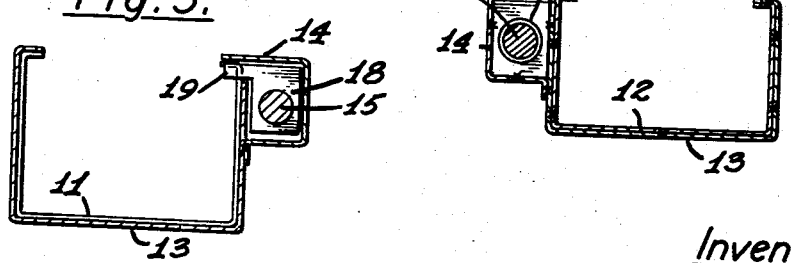
Figure 4 is a sectional view on line 4—4 of Figure 3.
Figure 5 is a sectional view on line 5—5 of Figure 3.

Each middle section 13 is provided with an elongated housing 14 secured to the middle section as by spot welding adjacent the middle section's upper outside length. The upper length of each housing is spacedly disposed above its trough section 11 and an elongated, longitudinally disposed screw 15 is mounted axially within each housing 14. The screw 15 has an end 16 projecting from the housing 14 which end is L-shaped, as shown in Figure 3. The screw 15 rigidly mounts a boss 30 which bears against the outer end 17 of the housing 14. The outer end 17 is secured to the housing 14 as by spot welding. The boss 30 rotates with the screw 15. The pin 31 holds the screw 15 against movement into the housing 14.

An L-shaped nut 18 carried on each screw 15 has a finger or leg 19 extending into the trough between its spacedly disposed housing which leg is adapted to engage the end of the section 11 when the screw 15 is rotated by the detachably secured wrench 20. Movement of the nut 18 away from the section 12 separates the sections 11, 12 and thereby tightens the endless sprocket chain, not shown, lying on the floor of the trough.

A feed hopper 21 is disposed above one corner of the trough, which hopper 21 is adapted to deposit feed therein. Corner cover plates 22, positioned over sprocket rollers, not shown, are provided to prevent injury to the feeding poultry.

It will thus be seen that the expansible trough herein shown and described may be readily and conveniently expanded from time to time to tighten a sprocket chain on the floor of the trough in instances wherein the chain requires tightening because of wear. The trough is simple in construction and is reasonably economical in manufacture.

While but one specific embodiment of the invention has been herein shown and described, it will be understood that certain details of the construction shown may be altered or omitted without departing from the spirit of the invention as the same is defined in the following claim.

I claim:

In a longitudinally extendable trough assembly, the combination comprising: a first trough section and a second trough section, said trough sections being longitudinally aligned; an intermediate trough section surrounding the adjacent ends of said first trough section and said second trough section and rigidly secured to said first trough section; said second trough section being adapted for longitudinal, sliding movement with respect to said intermediate trough section; a threaded member rotatably mounted on said intermediate trough section exteriorly thereof and parallel thereto; means for holding said threaded member against movement axially of said intermediate trough section; a nut on said threaded member; a finger on said nut engaging the end of said second trough section; a housing of rectilinear cross-section for enclosing said threaded member; said nut being of rectilinear cross-section and slidably received in said housing, the corners of said nut engaging said housing for holding said nut against rotation whereby said nut will urge said second trough section away from said first trough section upon rotation of said threaded member in one direction.

References Cited in the file of this patent

UNITED STATES PATENTS

| | | |
|---|---|---|
| 1,254,014 | Anderson | Jan. 22, 1918 |
| 1,484,891 | Klein | Feb. 26, 1924 |
| 2,169,973 | Davies | Aug. 15, 1939 |

FOREIGN PATENTS

| | | |
|---|---|---|
| 212,407 | Great Britain | Mar. 13, 1924 |